US 7,042,895 B1

(12) United States Patent
Nguyen et al.

(10) Patent No.: US 7,042,895 B1
(45) Date of Patent: May 9, 2006

(54) METHOD AND APPARATUS FOR INTERFACING MULTIPLE COMMUNICATION DEVICES TO A TIME DIVISION MULTIPLEXING BUS

(75) Inventors: Han Quang Nguyen, Allentown, PA (US); Avinash Velingker, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/405,205

(22) Filed: Sep. 24, 1999

(51) Int. Cl.
*H04B 7/212* (2006.01)
*H04B 1/38* (2006.01)
*H04J 3/00* (2006.01)
*H04L 5/16* (2006.01)

(52) U.S. Cl. .................. 370/442; 370/498; 375/222
(58) Field of Classification Search ............... 370/431, 370/433, 442, 458, 462–463, 461, 498; 375/222; 379/93.07, 399.01, 413.04, 442; 327/403
See application file for complete search history.

(56) References Cited

U.S. PATENT DOCUMENTS

| | | | | |
|---|---|---|---|---|
| 4,207,433 A * | 6/1980 | Bartholomay et al. | ...... | 370/251 |
| 4,627,046 A * | 12/1986 | Bellamy | ...... | 370/359 |
| 4,855,996 A | 8/1989 | Douskalis | ...... | 370/545 |
| 5,295,174 A * | 3/1994 | Shimizu | ...... | 377/76 |
| 5,315,596 A | 5/1994 | Lee | ...... | 370/369 |
| 5,631,908 A * | 5/1997 | Saxe | ...... | 370/235 |
| 5,734,334 A * | 3/1998 | Hsieh et al. | ...... | 340/2.2 |
| 5,742,640 A * | 4/1998 | Haoui et al. | ...... | 375/220 |
| 5,892,924 A * | 4/1999 | Lyon et al. | ...... | 709/245 |
| 5,912,888 A * | 6/1999 | Walsh et al. | ...... | 370/355 |
| 5,917,826 A | 6/1999 | Naessl et al. | ...... | 370/442 |
| 6,081,724 A * | 6/2000 | Wilson | ...... | 455/462 |
| 6,188,686 B1 * | 2/2001 | Smith | ...... | 370/388 |
| 6,195,362 B1 * | 2/2001 | Darcie et al. | ...... | 370/431 |
| 6,430,180 B1 * | 8/2002 | Bohm et al. | ...... | 370/369 |

* cited by examiner

*Primary Examiner*—Seema S. Rao
*Assistant Examiner*—Kevin C. Harper

(57) ABSTRACT

A time division multiplexing (TDM) method and apparatus for interfacing data from communication channels to a TDM bus. The TDM arrangement uses a shift register to control a tri-state buffer. The shift register regulates the tri-state buffer based on a data bit pattern loaded into the shift register. The data bit pattern corresponds to the status of the individual channels. Each channel is assigned a bit which indicates whether the channel is active or inactive. As the shift register shifts out data, the tri-state buffer allows data to flow onto the TDM bus when a bit indicating an active channel is present and insulates the TDM bus from the communication channels when a bit representing an inactive channel is present. A processor is used to control the interrelationship of the multiple communication channels and to generate the status bits to be loaded into the shift register. The processor fills the shift register through the use of a storage register. In a preferred embodiment, the shift register is capable of shifting out a sufficient number of bits to fill an entire transmission frame operating in T1 (24 channels), E1 (32 channels), 64-slot (64 channels), and 128-slot (128 channels) transmission modes. In addition, the tri-state buffer may perform the additional function of level shifting the voltage level of the data from the multiple communication channels to a level compatible with the TDM bus.

29 Claims, 4 Drawing Sheets

METHOD AND APPARATUS FOR INTERFACING MULTIPLE COMMUNICATION DEVICES TO A TIME DIVISION MULTIPLEXING BUS

FIELD OF THE INVENTION

The present invention relates to time division multiplexing (TDM) multiple communication channels on a bus.

BACKGROUND OF THE INVENTION

Time division multiplexing (TDM) techniques are commonly used in telecommunication systems to increase the amount of information that can be carried on a transmission line. For example, TDM techniques are used in the internal architecture of private branch exchanges (PBXs) and in the transmission of digital signals over telecommunication lines to maximize the amount of data which can be handled by these systems.

The majority of contemporary telecommunication systems use a TDM arrangement in which each off-hook connection (i.e., when the telephone line is in use) is allocated a specific periodic time interval for information transfer. The periodic time interval is generally equal to eight times the data bit rate of the connected device, allowing a word (8 bits) of information to flow during each periodic time interval assigned to that device.

Conventional time division multiplexing (TDM) arrangements are designed to operate with standard carrier TDM arrangements which have the capability of handling multiple channels on the same transmission line, such as T1 (24 channels), E1 (32 channels), 64-slot (64 channels), and 128-slot (128 channels) arrangements. Each TDM arrangement consists of a fixed length frame used to transmit data. The frame is divided into a predetermined number of time slots, each representing a different channel. For example, a T1 line is designed to carry 24 voice-grade channels with data from each channel broken down into 8 bit words. Combining 24 voice channels (24 channels times 8 bits per channel equals 192 bits) into a serial bit stream and including a framing bit yields a frame size of 193 bits. E1, 64-slot, and 128-slot TDM arrangements operate according to similar principles, with the exception that a framing bit is not used.

Internet service providers (ISPs) offer Internet access to home users by allowing home users to call local telephone numbers and use modems connected to the user's computer to communicate with modems located at the ISP. The ISP then processes the information received at its modems to generate data streams which can be placed on standard telecommunication lines, such as a T1 line, and transfers the data received by the modems located at the ISP to a telephone company central office for connection to the Internet. As the popularity of the Internet expands, ISPs will require telecommunication devices which allow data received from users through a large number of modem connections to be processed and placed on Internet connection lines that make the most efficient use of the transmission lines in a minimal amount of hardware space.

FIG. 6 is a block diagram illustrative of a prior art interface circuit 60 between multiple modem signals, represented by channel 1 through channel n, and a time division multiplexing (TDM) bus 68. In this simple multi-channel interface, tri-state buffers 62 are used to control access to the TDM bus 68. Controls 66 are used to control when the tri-state buffers 62 are active. When the TDM bus 68 is ready to accept information, the TDM bus 68 will signal the controls 66 to allow data to flow. The controls 66 will activate the tri-state buffers 62 to allow data to flow onto the TDM bus 68. In order to eliminate the potential for conflicts, the controls 66 are individually programmed to send data during a specified time slot assigned to the channel corresponding to the individual control. At all other times, the controls 66 will tri-state the tri-state buffers 62. When the tri-state buffers 62 are tri-stated, no data is allowed to flow from the channels to the TDM bus 68, leaving the TDM bus 68 idle for other devices to access.

The setup shown in FIG. 6 requires separate controls 66 for each tri-state buffer 62. The number of components required for this arrangement requires area which makes it difficult to develop more compact designs. Also, this arrangement uses separate controls 66 to activate the individual tri-state buffers 62 and control the duration of the activation, requiring processing power which could be used for other functions.

SUMMARY OF THE INVENTION

The present invention discloses a method and apparatus for interfacing multiple data channels to a time division multiplexing (TDM) bus. The interface is designed to accommodate a large number of data channels with a single tri-state buffer.

In a preferred embodiment, the present invention uses a shift register to control a tri-state buffer which is used to control data flow from the multiple communication devices onto the TDM bus or to tri-state the buffer. [Activating the buffer allows access to the TDM bus, while tri-stating the buffer indicates that the interface to the TDM bus is idle.] During periods when the interface is idle other devices may access the TDM bus.

A processor loads a storage register with time slot information which is then loaded from the storage register into the shift register. The processor initially loads the storage register with data bits corresponding to individual channels of data and updates the storage register only when the status of at least one of the channels changes.

In the preferred embodiment, the shift register contains enough data bits to represent each channel in a transmission frame, such as a T1 (24 channel), E1 (32 channel), 64-slot (64 channels), or 128-slot (128 channel) TDM arrangement. The shift register is loaded with data indicating the channels that are active and the channels that are inactive. The shift register then shifts out the appropriate pattern of bits corresponding to the number of channels in the data frame that are active for the desired transmission mode, allowing an entire data frame to be filled as the data is shifted out of the shift register. For example, in 64-slot transmission mode, 64 eight bit channels of information are sent in each transmission frame, however, in T1 transmission mode, only 24 eight bit channels are sent per frame. In this example, 64 bits representing the status of each channel would be loaded into the 64 least significant bits of a shift register and shifted out for each frame in 64-slot transmission mode. In contrast, only 24 bits would be loaded into the 24 least significant bits of the shift register when operating in T1 transmission mode. The shift register is capable of supporting transmission modes having as many channels as the shift register has bits, with the shift register reloading and shifting out data at the beginning of each transmission frame.

In an alternate embodiment, the tri-state buffer performs the additional function of voltage level shifting the data from the modem channels to a level compatible with a TDM bus.

For example, the tri-state buffer could increase the voltage level of a channel of data from 3.6 volts to 5 volts in order to be compatible with the voltage requirements of a TDM bus.

DETAILED DESCRIPTION OF THE INVENTION

Figure 1:
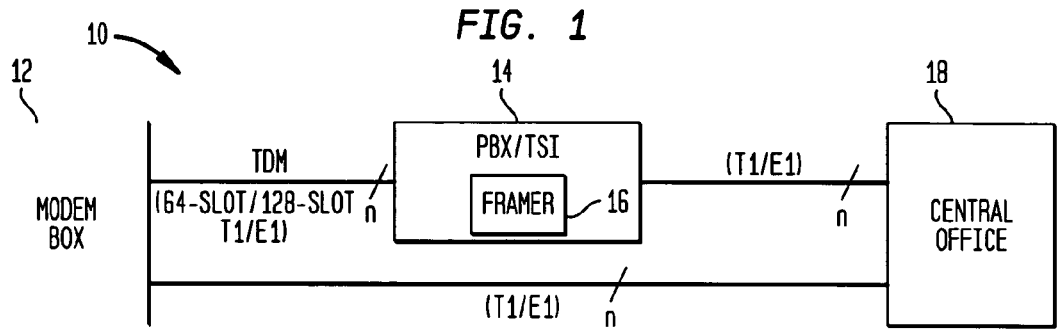
FIG. 1 is a block diagram of a telecommunication system in accordance with the present invention.

FIG. 1 is illustrative of an interface between a data device and a telephone company central office. The interface 10 comprises a modem box 12, a private branch exchange/time slot interchange (PBX/TSI) 14 containing a framer 16, and a telephone company central office 18. Modem box 12 comprises multiple modems and additional components for producing a time division multiplexed (TDM) signal from signals generated by the modems. Generally, modem box 12 is connected to the PBX/TSI 14 via a TDM arrangement. The PBX/TSI 14 then frames the data sent by the modem box 12 with a framer 16 to place the information from modem box 12 into an appropriate form for transmission over a transmission line using a standard TDM arrangement, such as a T1 (24 channels), E1 (32 channels), 64-slot (64 channels), or 128-slot (128 channels) TDM arrangement. The PBX/TSI 14 may interface with multiple lines, with each line operating according to its selected TDM arrangement. Another PBX/TSI system or the central office 18 then receives the information in an appropriate form and distributes the signals to the Internet or another telecommunication center. Alternatively, the modem box 12 may interface with the central office 18 directly using available TDM arrangements.

Figure 2:
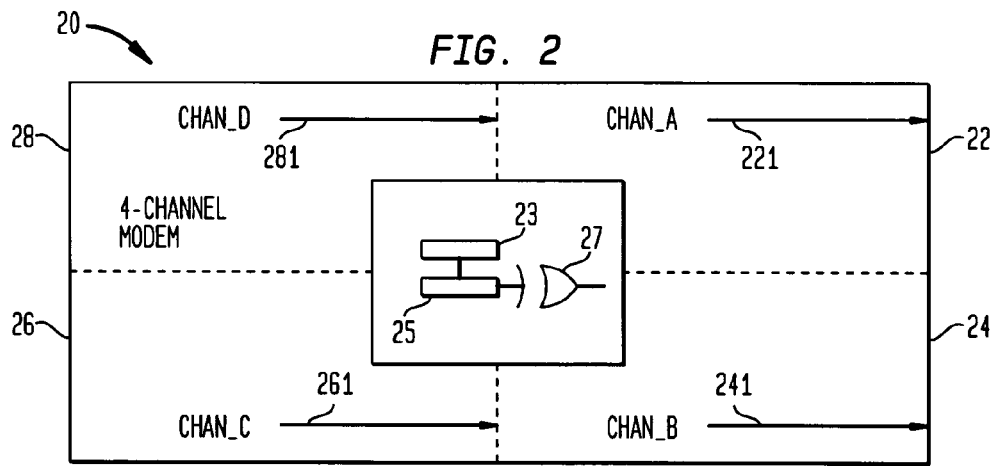
FIG. 2 is a block diagram of a 4-channel modem in accordance with the present invention.

FIG. 2 depicts a standard 4-channel modem 20. A 4-channel modem consists of four separate modems for processing data obtained from 4 separate channels, a storage register 23, a shift register 25, and an eXclusive OR (XOR) gate 27. Modem-A 22 comprises a data path 221 bearing a CHAN-A data stream. The CHAN-A data stream 221 comprises the data from an external modem, such as a modem connected to a user's home or office personal computer (PC), connected through a standard consumer telephone line. The other three modems 24, 26, and 28 exhibit an identical setup to modem-A 22: with modem-B 24 comprising CHAN-B data stream line 241; modem-C 26 comprising CHAN-C data stream line 261; and modem-D 28 comprising CHAN-D data stream line 281. The 4-channel modem 20 will be used to describe the present invention, however, the inventive concept applies equally well to multiple single channel modems or to modems having the capacity for many more channel connections.

Figure 3:
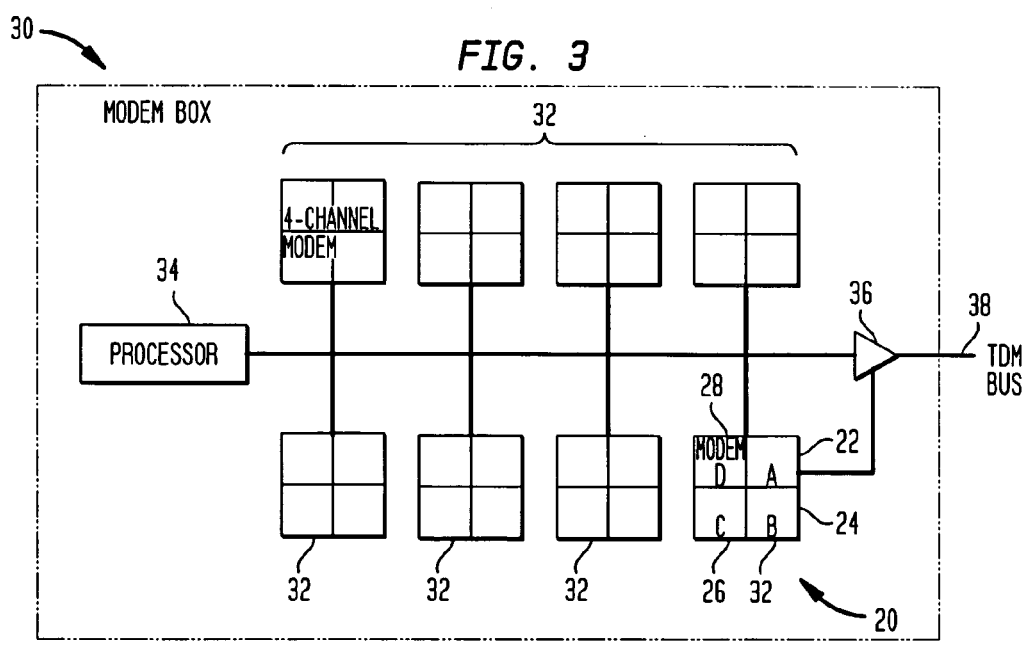
FIG. 3 is a system diagram of a TDM bus interface in accordance with the present invention.

FIG. 3 illustrates an implementation of multiple 4-channel modems 32 to create a modem box 30 in accordance with the present invention. In a preferred embodiment, modem box 30 comprises eight 4-channel modems 32, a processor 34, and a tri-state buffer 36. The eight 4-channel modems 32 represent 32 channels (8 modems times 4 channels per modem equals 32 channels). The tri-state buffer 36 is used to control the connection of data from the modems 32 to the TDM bus 38. In addition, the tri-state buffer 36 may be used to shift the voltage level of data signals from the 4-channel modems 32 to a voltage level compatible with the TDM bus 38. In a preferred embodiments, the processor 34 is a conventional reduced instruction set computer (RISC) which provides very high speed processing. Processor 34 controls the interrelationship of the various 4-channel modems 32, and controls the interface between the 4-channel modems 32 and the level shifting tri-state buffer 36. In the preferred embodiment, the tri-state buffer 36 is controlled by the processor 34 through the components of a single 4-channel modem 32. In FIG. 3, the tri-state buffer 36 is controlled by the components of 4-channel modem 20. It will be apparent to those skilled in the art that processor 34 can be a micro-controller, microprocessor, digital signal processor, computer, state machine, or essentially any digital processing circuit.

Figure 4:
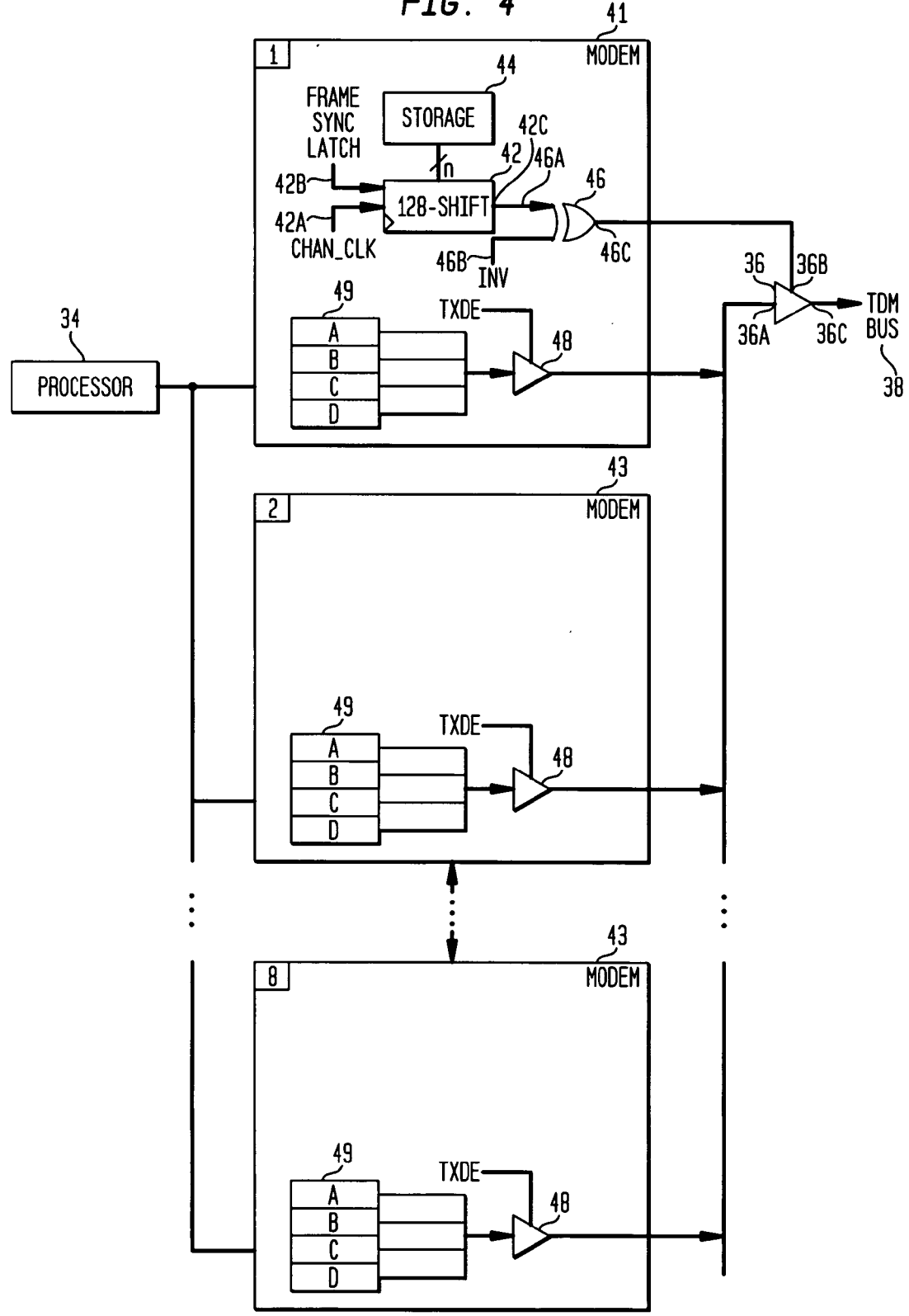
FIG. 4 is an exploded system diagram of the TDM bus interface of FIG. 3 in accordance with the present invention.

FIG. 4 is an exploded view of the modem box 30 depicted in FIG. 3. The block diagram illustrates how a single storage register 44, shift register 42 and XOR gate 46 in a modem 41 can be used to control tri-state buffer 36. Storage register 44, shift register 42 and XOR gate 46 of FIG. 4 correspond to the storage register 23, shift register 25 and XOR gate 27 of FIG. 2, respectively. Components identical to storage register 44, shift register 42 and XOR gate 46 are present in each 4-channel modem 43. FIG. 4 shows the processor 34, 4-channel control modem 41, 4-channel modems 43, and tri-state buffer 36. In a preferred embodiment, the 4-channel control modem 41 is identical to the 4-channel modems 43. The 4-channel control modem 41 is distinguished from the 4-channel modems 43 to indicate that the components from the 4-channel control modem 41 are used to control the tri-state buffer 36. The components from any of the 4-channel modems 41 and 43 could be used by processor 34 to control the tri-state buffer 36.

4-channel control modem 41 comprises shift register 42, storage registers 44, tri-state buffer 48, and XOR gate 46. Only the shift register 42, storage registers 44, and XOR gate 46 of 4-channel control modem 41 are used and, therefor, are the only ones depicted in detail. Since the circuitry of each modem channel is identical, any of the 4 modem channels could be used. Although the components from the other 4-channel modems 43 are not used to control the tri-state buffer 36, they may be used to perform other functions, thus maximizing system resources.

Shift register 42 is loaded with a bit pattern representing the status of each data channel within modem box 40 every time a frame sync latch signal 42B is asserted. After a frame sync latch signal 42B is asserted, the shift register 42 begins shifting out the data one bit at a time. The rate at which the data is shifted out of shift register 42 is controlled by the clock pulse signal 42A. The clock pulse signal 42A is 8 times as long as the data bit rate of the individual modems 41 and 43. By controlling the tri-state buffer 36 though XOR gate 46, shift register 42 allows 8 bits of data (one word or time slot) to flow onto the TDM bus 38 during each active bit shifted out of shift register 42. The shift register 42 is loaded though the use of storage registers 44.

In a preferred embodiment, shift register 42 is loaded with data via storage registers 44. The data comprises bits which correspond to the individual modems A–D 49 and indicate the status, either active or inactive, of the respective modems A–D 49. A data bit indicating that a channel is active prompts the system to allow access to the TDM bus, while a data bit indicating that a channel is inactive prompts the system to insulate the modem from the TDM bus. The information from storage registers 44 is loaded into shift register 42 every time a frame sync latch signal 42B is asserted. The frame sync latch signal 42B is asserted upon receipt of the frame sync pulse that arrives at and only at the beginning of each frame. Each data bit in shift register 42 corresponds to a different channel of data. A 128-bit shift register 42 is capable of controlling up to 128 different channels of data. The system 40 accommodates and maximizes efficiency for different TDM arrangements. For example, if the system were interfacing with a T1 line which has only 24 channels, the frame sync latch signal is asserted every 24 bits. Thus, only the 24 least significant bits of information loaded via the storage registers 44 into the shift register 42 are shifted out. This same system maximizes the efficiency for an E1 line because the frame sync latch signal 42B is asserted every 32 bits and similarly for 64-slot and 128-slot TDM arrangements.

The use of storage registers 44 increase system performance by reducing the demand on processor 34. Demand on processor 34 is reduced because the storage registers 44 only need to be reloaded when the status of one or more of the modem channels A–D 49 are revised (i.e., activated or deactivated.) During each pulse of frame sync latch signal 42B, the shift register 42 is loaded with data bits from the storage registers 44. If the status of all the modem channels 49 A–D remain the same, the data already stored in the storage registers 44 is reloaded into the shift register 42 without processor intervention. As long as the channel connections remain the same, the storage registers 44 do not require updating. This arrangement reduces the processing power required from processor 34, thereby freeing up resources for other applications.

For illustrative purposes only, a 128-bit shift register 42 is shown. However, shift registers with many more bits representing many more channels or many less bits representing fewer channels could be used in accordance with the present invention. Also, multiple shift registers could be used to obtain the desired number of channel-representing data bits. Various alternate shift register configurations should be readily apparent to those skilled in the art.

In the preferred embodiment, shift register 42 receives a channel clock (chan-clk) signal that has a clock period that is eight times longer than the data bit rate of control modem 41 and modems 43 (i.e., runs at ⅛ the speed of the data clock.) This arrangement allows time for a selected channel to place 8 bits (1 word) of data into one time slot of the TDM bus 38 during each active bit shifted out by the shift register 42. Generally, an active channel will be represented by a "1" and an inactive channel will be represented by a "0" in the corresponding position in shift register 42. Alternatively, an active channel may be represented by a "0" and an inactive channel may be represented by a "1."

Exclusive OR (XOR) gate 46 is used to ensure compatibility between the output 42C of shift register 42 and the control terminal 36B of level shifting tri-state buffer 36. If a low value is applied to the inverting input 46B, the tri-state control signal will pass unchanged from the input 46A to the output 46C of the XOR gate 46 to control the control terminal 36B of level shifting tri-state buffer 36. If a high value is applied to inverting input 46B, XOR gate 46 will act as an inverter. This feature increase system compatibility. For example, some tri-state buffers are active when they receive a high value and tri-state when they receive a low value, and other tri-state buffers are active when they receive a low value and tri-state when they receive a high value. Allowing for the data stream out of shift register 42 to be inverted creates greater flexibility in choosing system components.

Tri-state buffer 48, located in each of the 4-channel modems 41 and 43, can be used to allow data to flow from data channels A–D 49 to level shifting tri-state buffer 36 or can be tri-stated to indicate that data channels A–D 49 are inactive. If tri-state buffer 48 is tri-stated, the connection between the modems 41 and 43, containing the tri-stated buffer 48, and the level shifting tri-state buffer 36 would be idle, allowing other modems 41 and 43 to access the tri-state buffer 36 connection. Whether tri-state buffers 48 are needed depends on the system design. Modification will be readily apparent to those skilled in the art. For example, the processor 34 could control the modems in such a way as to only allow channels A–D 49 to output data at predetermined times, eliminating the need for tri-state buffers 48. Or tri-state buffers 48 could be retained to provide a redundant check to prevent multiple channels attempting to access the level shifting tri-state buffer 36 at the same time.

In a preferred embodiment, the level shifting tri-state buffer 36 performs the additional function of making the voltage level of the data output from the control modem 41 and modems 43 compatible with the TDM bus 38. The level shifting tri-state buffer 36 interfaces with the TDM bus 38 through output 36C. The tri-state buffer 36 accomplishes voltage level compatibility by voltage level shifting the voltage level of the data bits received at input 36A of level shifting tri-state buffer 36 to the voltage level required by the TDM bus 38. For example, if the voltage level of the data stream entering input 36A of level shifting tri-state buffer 36 is at 3.6 volts and the TDM bus requires that the voltage level of the data be at 5 volts, the level shifting tri-state buffer 36 can raise the voltage level from 3.6 volts to 5 volts. A voltage level shifting tri-state buffer 36 can raise, lower, or maintain the same voltage level between input 36A and output 36C based on system requirements. Voltage level shifting is well known in the art and will not be discussed in further detail.

Figure 5:
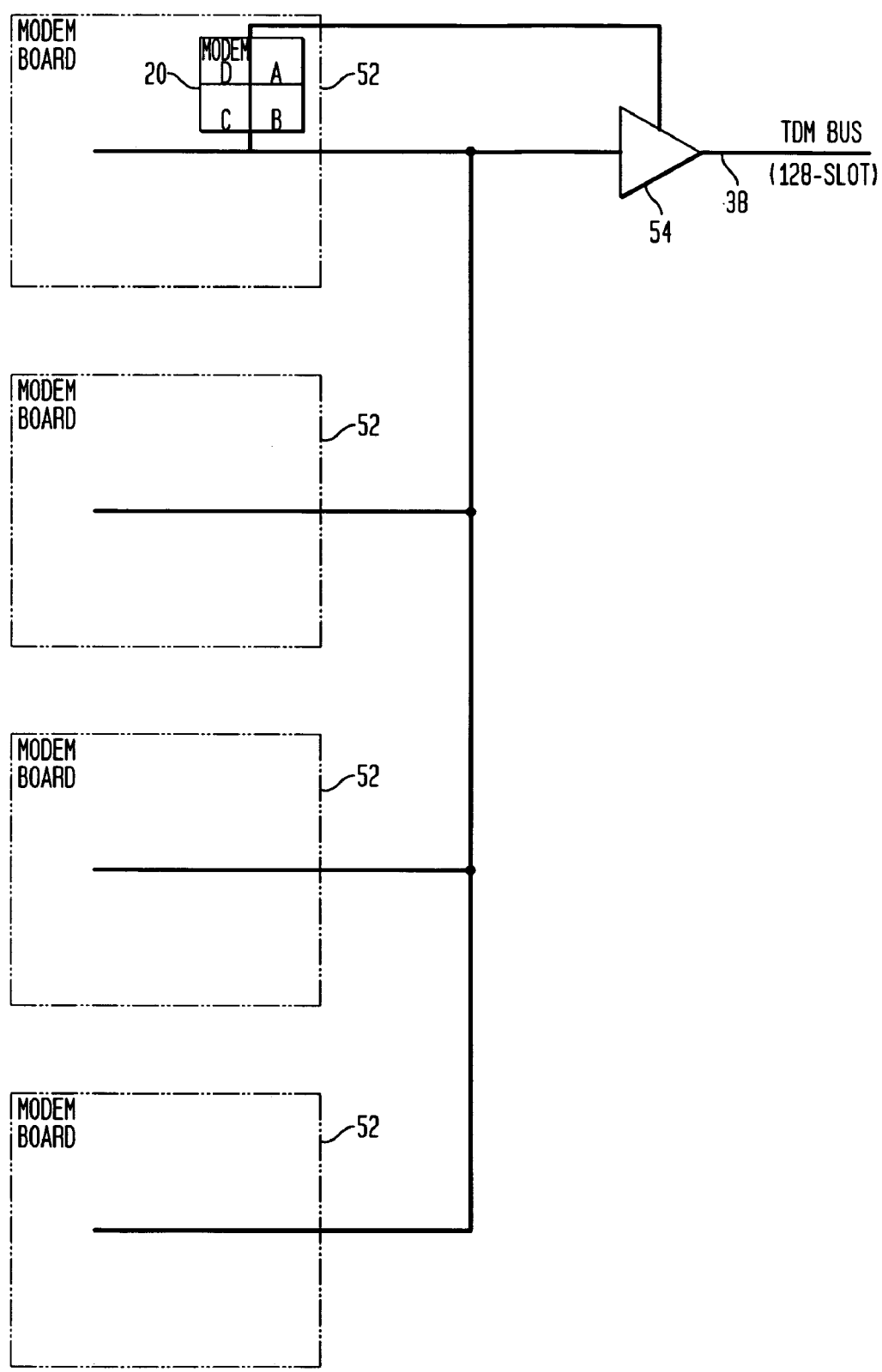
FIG. 5 is an alternative system diagram of a TDM bus interface in accordance with the present invention.
Figure 6:
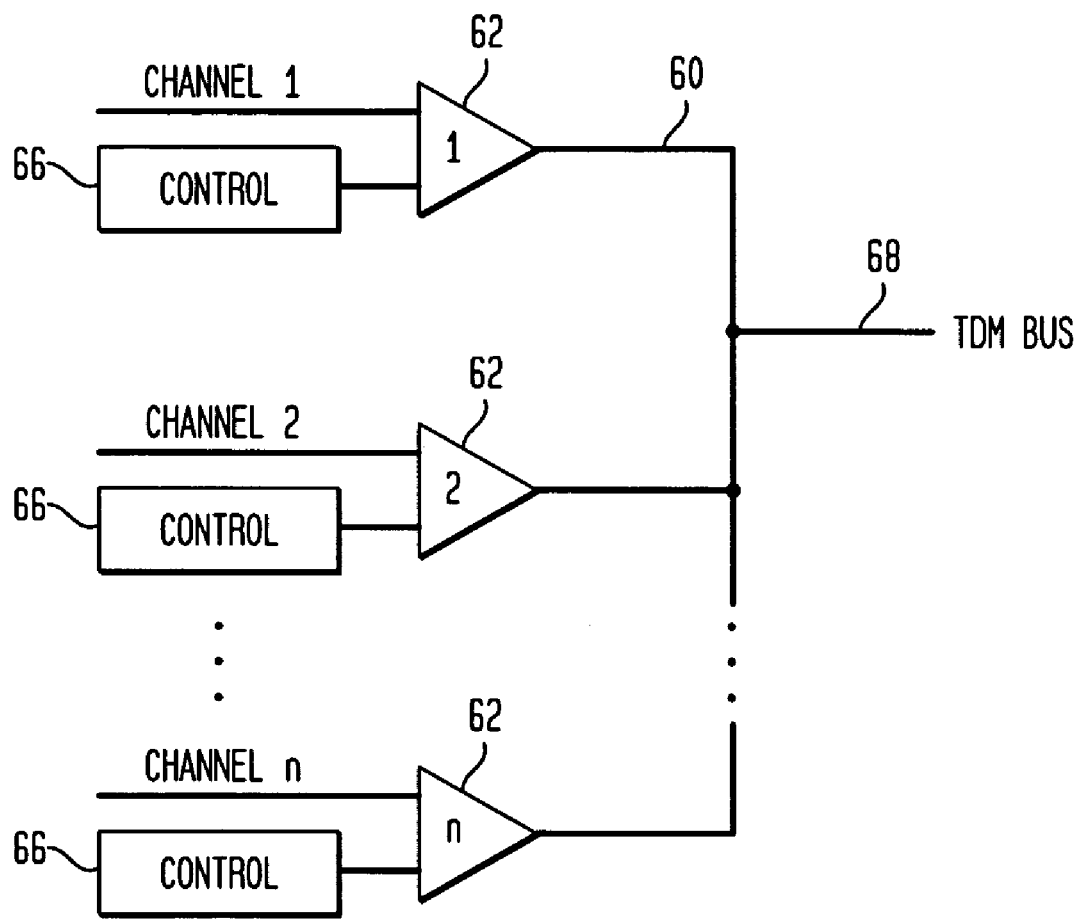
FIG. 6 is a block diagram of a prior art TDM bus interface.

FIG. 5 depicts an alternative preferred embodiment of the present invention. The TDM interface depicted in FIG. 5 comprises a tri-state buffer 54 and four modem boards 52. The tri-state buffer 54 is used to allow data to flow from the modem boards 52 onto the TDM bus 38 or to isolate the TDM bus 38 from the modem boards 52. Each modem board comprises eight 4-channel modems 20 for a system total of 128 channels (4 boards*8 modems*4 channels=128 channels.) This arrangement allows a storage register and shift register from a single 4-channel modem 20, to control a single tri-state buffer 54 which regulates the flow of 128 channels of data onto a TDM bus 38. The storage registers and shift registers operate according to the same principles discussed above. In FIG. 5, 128 channels are being interfaced with a TDM bus 38 operating in 128-slot mode. However, many more channels could be accommodated as TDM arrangements which accommodate more channels are developed.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A time division multiplexing (TDM) arrangement comprising:
   a TDM bus;
   a tri-state buffer having an input, a control terminal, and an output coupled to said TDM bus;
   a plurality of devices, each generating a data stream output, and each said device data stream output simultaneously coupled to the input of said tri-state buffer and;
   a channel indicator circuit coupled to said control terminal of said tri-state buffer for controlling said tri-state buffer, such that said tri-state buffer is enabled during said time period corresponding to each one of said devices is generating a data stream, and said tri-state buffer is disabled during said time period corresponding to each one of said devices that is not generating a data stream.

2. The time division multiplexing (TDM) arrangement of claim 1, wherein said tri-state buffer shifts a first voltage level associated with said data streams to a second voltage level compatible with said TDM bus.

3. The time division multiplexing (TDM) arrangement of claim 2, wherein said first voltage level is about 3.6 volts and said second voltage level is about 5 volts.

4. The time division multiplexing (TDM) arrangement of claim 1, further comprising a framer operably connected to said TDM bus, wherein said framer puts said data stream in a TDM frame for use in a TDM format selected from a group consisting of T1, E1, 64-slot, and 128-slot.

5. The time division multiplexing (TDM) arrangement of claim 1, wherein said plurality of devices for generating data streams are modems.

6. The time division multiplexing (TDM) arrangement of claim 1, wherein said arrangement is contained on a single printed circuit board.

7. A time division multiplexing (TDM) arrangement comprising:
   a TDM bus;
   a tri-state buffer having an input, a control terminal, and an output coupled to said TDM bus;
   a plurality of devices, each generating a data stream during a particular time period assigned on the TDM bus to said device, and each said device simultaneously coupled to the input of said tri-state buffer; and
   a channel indicator circuit coupled to said control terminal of said tri-state buffer for controlling said tri-state buffer, such that said tri-state buffer is enabled during said time period corresponding to each one of said devices is generating a data stream, and said tri-state buffer is disabled during said time period corresponding to each one of said devices that is not generating a data stream,
   wherein said channel indicator circuit comprises a shift register having an output coupled to the control terminal of said tri-state buffer, said shift register serially shifting out a plurality of bits of information, each bit corresponding to one of said devices, a status of said bit indicating whether said corresponding device is generating a data stream or is not generating a data stream, such that said tri-state buffer is controlled based on information contained in said shift register.

8. A time division multiplexing (TDM) arrangement comprising:
   a TDM bus;
   a tri-state buffer having an input, a control terminal, and an output coupled to said TDM bus;
   a plurality of devices, each generating a data stream during a particular time period assigned on the TDM bus to said device, and each said device simultaneously coupled to the input of said tri-state buffer; and
   a channel indicator circuit coupled to said control terminal of said tri-state buffer for controlling said tri-state buffer, such that said tri-state buffer is enabled during said time period corresponding to each one of said devices is generating a data stream, and said tri-state buffer is disabled during said time period corresponding to each one of said devices that is not generating a data stream,
   wherein said channel indicator circuit comprises:
      a register for storing a plurality of bits of information, each bit corresponding to one of said devices, a status of said bit indicating whether said corresponding device is generating a data stream or is not generating a data stream; and
      a shift register having inputs coupled to said register and an output coupled to the control terminal of said tri-state buffer, wherein said shift register generates a transmit control signal by sequentially shifting out said bits of information, whereby said tri-state buffer is controlled based on said bits of information contained in said register.

9. The time division multiplexing (TDM) arrangement of claim 8, wherein said tri-state buffer shifts a first voltage level associated with said data streams to a second voltage level compatible with said TDM bus.

10. The time division multiplexing (TDM) arrangement of claim 9, wherein said first voltage level is about 3.6 volts and said second voltage level is about 5 volts.

11. The time division multiplexing (TDM) arrangement of claim 9, wherein said register comprises a plurality of registers.

12. The time division multiplexing (TDM) arrangement of claim 11, wherein said shift register is a parallel in, serial out shift register.

13. The time division multiplexing (TDM) arrangement of claim 9, wherein said channel indicator circuit further comprises:
   a signal modifier circuit having an input coupled to the output of said shift register, an output coupled to the control terminal of said tri-state buffer, and an inverter terminal; and
   an inverter circuit coupled to the inverter terminal of said signal modifier circuit, wherein said inverter circuit controls whether said transmit signal passes through said signal modifier circuit unchanged or is inverted.

14. The time division multiplexing (TDM) arrangement of claim 13, wherein said signal modifier circuit comprises an XOR gate and wherein said input of said signal modifier circuit is supplied to a first input terminal of said XOR gate and said inverter terminal of said signal modifier circuit is supplied to a second input terminal of said XOR gate.

15. The time division multiplexing (TDM) arrangement of claim 9, wherein said shift register is a 128 bit shift register and said register comprises eight 16-bit storage registers.

16. A method for interfacing multiple data streams with a time division multiplexed (TDM) bus, comprising the steps of:
   coupling a plurality of data channels capable of generating data streams to a TDM bus through a tri-state buffer, each of said data channels adapted to generate said corresponding data stream during a particular time period;

programming a pre-defined bit pattern into a register, wherein each bit of said pre-defined bit pattern corresponds to one of said plurality of data channels, a status of said bit indicating whether said data channel is active or inactive;

latching said pre-defined bit pattern into a shift register;

shifting said pre-defined bit pattern out of said shift register serially one bit at a time; and controlling said tri-state buffer with said pre-defined bit pattern shifted out of said shift register, such that said tri-state buffer is active during said time periods corresponding to active data channels and is inactive during said time periods corresponding to inactive data channels.

17. The method of claim 16, further comprising the step of level shifting the output of said tri-state buffer to a level compatible with said TDM bus.

18. The method of claim 17, wherein said step of level shifting shifts the output of said tri-state buffer from about 3.6 volts to about 5 volts.

19. The method of claim 17, wherein said predefined bit pattern contains a number of bits equal to the number of data channels in a selected TDM frame format.

20. The method of claim 19, wherein said TDM frame format is selected from a group consisting of T1, E1, 64-slot, and 128-slot.

21. The method of claim 19, further comprising the step of generating a frame sync latch pulse which corresponds to the beginning of each frame of the selected TDM frame format and, wherein said step of latching said pre-defined bit pattern into said shift register occurs at every frame sync latch pulse.

22. A modem box comprising:
a plurality of modems;
a voltage level shifting tri-state buffer having an input terminal coupled to said plurality of modems, a control terminal, and a data output terminal;
a control circuit coupled to the control terminal of said voltage level shifting tri-state buffer; and
a processor coupled to said plurality of modems and said control circuit, wherein said processor monitors said plurality of modems and generates data for use by said control circuit, thereby regulating said voltage level shifting tri-state buffer.

23. The modem box of claim 22, wherein said control circuit is associated with a single modem of said plurality of modems.

24. A modem box comprising:
a plurality of modems;
a tri-state buffer having an input terminal coupled to said plurality of modems, a control terminal, and a data output terminal;
a register for storing a plurality of bits of information, each bit corresponding to one of said modems, a status of said bit indicating whether said corresponding modem is active or inactive;

a shift register having inputs coupled to said register and an output coupled to the control terminal of said tri-state buffer, said shift register generating an output signal by sequentially shifting out said information related to said plurality of devices received from said register; and
a processor coupled to said plurality of modems and said register, wherein said processor monitors said plurality of modems, generates said plurality of bits of information, and loads said register with said plurality of bits of information, thereby controlling said tri-state buffer.

25. The modem box of claim 24, wherein said tri-state buffer shifts a first voltage level at the input of said tri-state buffer to a second voltage level at the data output of said tri-state buffer.

26. An integrated circuit comprising;
a plurality of modems;
a voltage level shifting tri-state buffer having an input terminal coupled to said plurality of modems, a control terminal, and a data output terminal;
a control circuit coupled to the control terminal of said voltage level shifting tri-state buffer; and
a processor coupled to said plurality of modems and said control circuit, wherein said processor monitors said plurality of modems and generates data for use by said control circuit, thereby controlling said voltage level shifting tri-state buffer.

27. The integrated circuit of claim 26, wherein said control circuit is associated with a single modem of said plurality of modems.

28. An integrated circuit comprising;
a plurality of modems;
a tri-state buffer having an input terminal coupled to said plurality of modems, a control terminal, and a data output terminal;
a register for storing a plurality of bits of information, each bit corresponding to one of said modems, a status of said bit indicating whether said corresponding modem is active or inactive;
a shift register having input terminals coupled to said register and an output terminal coupled to the control terminal of said tri-state buffer, said shift register generating an output signal by sequentially shifting out said information related to said plurality of devices received from said register; and
a processor coupled to said plurality of modems and said register, wherein said processor monitors said plurality of modems, generates said plurality of bits of information, and loads said register with said plurality of bits of information, thereby controlling said tri-state buffer.

29. The integrated circuit of claim 28, wherein said tri-state buffer shifts a first voltage level at the input of said tri-state buffer to a second voltage level at the data output of said tri-state buffer.

* * * * *